United States Patent [19]

Stokes et al.

[11] Patent Number: 4,530,097
[45] Date of Patent: Jul. 16, 1985

[54] BRILLOUIN RING LASER

[75] Inventors: Loren F. Stokes, Palo Alto; Herbert J. Shaw; Marvin Chodorow, both of Stanford, all of Calif.

[73] Assignee: The Board of Trustees of the Leland Stanford Junior University, Stanford, Calif.

[21] Appl. No.: 426,885

[22] Filed: Sep. 29, 1982

[51] Int. Cl.³ .............................................. H01S 3/30
[52] U.S. Cl. ........................................... 372/6; 372/3; 372/94; 356/350; 350/96.15
[58] Field of Search ............... 372/6, 3, 94; 356/350; 350/96.15

[56] References Cited

U.S. PATENT DOCUMENTS

| 4,107,628 | 8/1978 | Hill et al. | 372/6 |
| 4,136,929 | 1/1979 | Suzaki | 372/6 |
| 4,410,275 | 10/1983 | Shaw et al. | 356/350 |
| 4,473,270 | 9/1984 | Shaw | 350/96.15 |

FOREIGN PATENT DOCUMENTS 1156489 11/1983 Canada .
8001892 1/1980 France .

OTHER PUBLICATIONS

Ezekiel, S.; Cole, J. A.; Harrison, J.; and Sanders, G.; "Passive Cavity Optical Rotation Sensor", *SPIE*, vol. 157, *Laser Inertial Rotation Sensors*, 1978, pp. 68-72.
Jackson, D. A.; Dandridge, A.; and Sheem, S. K., "Measurement of Small Phase Shifts Using a Single-Mode Optical-Fiber Interferometer", *Optics Letters*, vol. 5, No. 4, Apr. 1980, pp. 139-141.
Hill, K. O.; Kawasaki, B. S.; and Johnson, D. C., "cw Brillouin Laser", *Applied Physics Letters*, vol. 28, No. 10, May 15, 1976, pp. 608-609.
Ponikvar, Donald R. and Ezekiel, Shaoul, "Stabilized Single-Frequency Stimulated Brillouin Fiber Ring Laser", *Optics Letters*, vol. 6, No. 8, Aug. 1981, pp. 398-400.
Jackson, D. A.; Priest, R.; Dandridge, A.; and Tveten, A. B., "Elimination of Drift in a Single-Mode Optical Fiber Interferometer Using a Piezoelectrically Stretched Coiled Fiber", *Applied Optics*, vol. 19, No. 17, Sep. 1, 1980, pp. 2926-2929.
Sanders, G. A.; Prentiss, M. G.; and Ezekiel, S., "Passive Ring Resonator Method for Sensitive Inertial Rotation Measurements in Geophysics and Relativity", *Optics Letters*, vol. 6, No. 11, Nov. 1981, pp. 569-571.
Petuchowski, S. J.; Giallorenzi, T. G.; and Sheem, S. K., "A Sensitive Fiber Optic Fabry-Perot Interferometer", *IEEE Journal of Quantum Electronics*, vol. QE-17, No. 11, Nov. 1981, pp. 2168-2170.
"Single Mode Fiber Optic Directional Coupler", Bergh, et al., *Electronic Letters*, Mar. 27, 1980, vol. 16, No. 7.

*Primary Examiner*—James W. Davie
*Assistant Examiner*—Léon Scott, Jr.
*Attorney, Agent, or Firm*—Knobbe, Martens, Olson & Bear

[57] ABSTRACT

A Brillouin ring laser comprises a fiber optic resonator formed from a loop of fiber optic material and a fiber optic directional coupler for optically closing the loop.

15 Claims, 13 Drawing Figures

BRILLOUIN RING LASER

BACKGROUND OF THE INVENTION

The present invention relates to ring lasers, and particularly to an all-fiber Brillouin ring laser, having a sub-milliwatt pump threshold power.

Present, commercially available, ring lasers typically comprise three or more mirrors, positioned in a medium, such as helium neon gas, and oriented to form a ring-shaped cavity for guiding counter-propagating waves therethrough. Rotation of the ring-shaped cavity causes each of the counter-propagating waves to experience a frequency shift, proportional to the rotation rate. By measuring the frequency difference between the counter-propagating waves, the ring laser provides an indication of rotation rate, and thus, may be used as a highly accurate rotation sensor, e.g., for inertial navigation. One common problem with these ring lasers is that counter-propagating waves tend to become frequency locked, and insensitive to rotation. Such frequency locking may be prevented by continuously dithering (mechanically vibrating) the laser, however, the need for a mechanical dithering system tends to defeat the principal purpose of the ring laser, viz., providing a reliable, accurate, rotation sensor without moving parts. The frequency locking problem may be caused by the fact that the laser's gain is bidirectional, that is, the same collection of HeNe atoms are utilized for stimulated emission of both counter-propagating waves. Accordingly, it is believed that frequency locking may be avoided by utilizing a laser in which the gain is unidirectional. One type of laser having such unidirectional gain is a Brillouin fiber ring laser, in which energy for stimulated Brillouin emission is provided by a pump light wave which counter-propagates relative to the Brillouin wave.

Prior art Brillouin fiber lasers are typically lossy, hybrid devices, in which the resonant laser cavity is formed from both fiber optic and bulk optic components. For example, lenses, mirrors, and beam splitters are commonly coupled to long lengths of single-mode fiber. Maintaining alignment of these components is difficult, particularly if they are subjected to shock or vibration. Further, the round trip losses of light circulating through the laser's resonant cavity are quite high, for example, on the order of 70%. Consequently, high threshold pump power, e.g., on the order of 100 mW is required to achieve Brillouin gain. It is believed that even the most carefully constructed prior art Brillouin fiber lasers would require threshold powers of more than 10 mW.

Prior art Brillouin lasers have, therefore, commonly utilized high power, single frequency lasers, e.g., argon gas lasers, for the pump. Such a laser, however, has inherently poor stability, in terms of frequency drift, unless special stabilization techniques are employed. Further, the coherence length of such lasers is relatively short, and therefore, the purity of the single frequency light is relatively poor.

Accordingly, there is a need in the art for an improved Brillouin laser having low round trip cavity losses, so that a highly stable, low power, long coherence length, single frequency laser, such as a helium neon laser, can be used as a pump.

SUMMARY OF THE INVENTION

The Brillouin ring laser of the present invention provides a resonant laser cavity comprised entirely of optical fiber. Specifically, the cavity comprises a loop of optical fiber which is closed, without splices, by means of a tunable, fiber optic, evanescent field directional coupler. The coupler insertion losses are quite low (e.g., less than 5%) so that the round trip losses of light circulating through the fiber loop are very small. Consequently, Brillouin laser action can be achieved at a pump power of less than 10 mW, thus providing an entirely new class of low threshold power Brillouin lasers, not available in the prior art.. In the embodiment shown, stimulated Brillouin oscillation was observed at only 0.43 mW of pump power.

It has been found that the threshold pump power required for Brillouin lasing can be further reduced by properly sizing the length of the fiber loop. Specifically, the length of the fiber loop should be such that the fiber transmission losses (e.g., due to attenuation of the light by the fiber) are equal to the coupler insertion losses.

BRIEF DESCRIPTION OF THE DRAWINGS

These and other aspects of the present invention may be further understood through reference to the drawings in which.

DETAILED DESCRIPTION OF THE PREFERRED EMBODIMENT

Figure 1:
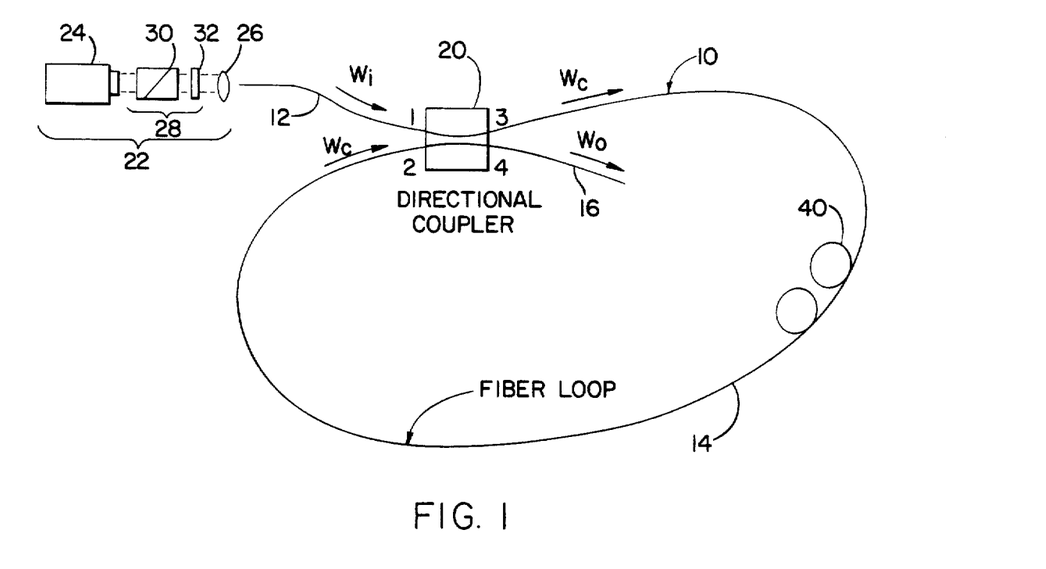
FIG. 1 is a schematic drawing of the resonator utilized in the Brillouin ring laser of the present invention, showing a light source for introducing light into the fiber loop, and a fiber optic directional coupler for closing the fiber loop.

The Brillouin laser of the present invention utilizes a fiber optic resonator, described and claimed in copending patent application Ser. No. 426,890, entitled "Fiber Optic Resonator", filed Sept. 29, 1982, by the inventors of the present invention, and assigned to the assignee of the present invention. This application issued June 21, 1983 as U.S. Pat. No. 4,389,090. As shown in FIG. 1, the resonator comprises a continuous, uninterrupted strand 10 of single mode optical fiber, having an input end portion 12, a loop portion 14, and an output end portion 16. At the ends of the loop portion 14, the fiber 12 is optically coupled together by means of a fiber optic, evanescent field, four port, directional coupler 20, having ports 1 and 2 on one side thereof, and ports 3 and 4 on the other side thereof. Tracing the fiber 12 from one end to the other, the fiber 10 first passes through ports 1 and 3, and then through ports 2 and 4, so that the loop 14 extends from ports 3 and 2, while the input portion 12 extends from port 1, and the output portion 16 extends from port 4.

A laser source 22 is provided to introduce light into the input fiber portion 12, for circulation through the loop portion 14. The source 22 comprises a single frequency, continuous wave, long coherence length laser 24, such as a Tropel model 200 HeNe gas laser. This laser produces single frequency light at a wavelength of 632.8 nm and has a coherence length of well over a kilometer.

A lens 26 may be used to focus light from the laser 24 for introduction into the fiber portion 12. In addition, an optical isolator 28, comprising a polarizer 30 and a quarterwave plate 32 may be interposed between the laser 24 and lens 26 to prevent light reflected from the lens 26 and fiber portion 12 from entering the laser 24, and interfering with its operation.

In the resonator embodiment shown, the fiber 10 comprises an ITT single mode fiber having a core diameter of 4 microns, an effective core area of $1.6 \times 10^{-7}$ cm$^2$, an effective refractive index of 1.46, and an attenuation of 8.3 db/km. The loop 14 includes a polarization controller 40 to provide compensation for fiber birefringence in the loop 14, so that circulating light at port 2 of the coupler 20 has substantially the same polarization as light from the laser source 22 at the port 1.

Both the polarization controller 40 and the coupler 20 are fiber optic, as distinguished from bulk optic components.

THE COUPLER 20

A preferred fiber optic directional coupler for use as the coupler 20 in the resonator is described in copending patent application Ser. No. 300,955, filed 9/10/81, entitled FIBER OPTIC DIRECTIONAL COUPLER, which is a continuation-in-part of application Ser. No. 139,511, filed 4/11/80, entitled FIBER OPTIC DIRECTIONAL COUPLER, both of which are assigned to the assignee of the present invention. In addition, the coupler is described in the Mar. 29, 1980 issue of *Electronics Letters*, Vol. 16, No. 7, pages 260-261. These patent applications and publication are hereby incorporated by reference herein.

Figure 2:
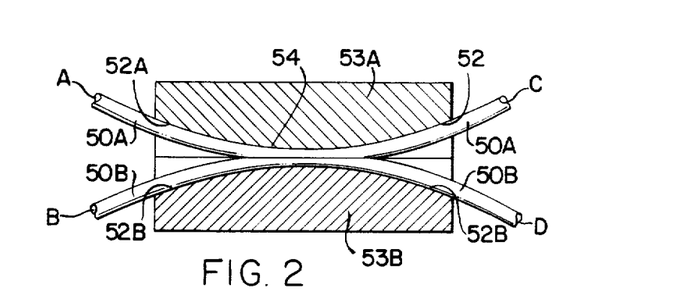
FIG. 2 is a sectional view of one embodiment of a fiber optic directional coupler for use in the resonator of FIG. 1.

As illustrated in FIG. 2, the coupler includes two exemplary strands 50A and 50B of a single mode fiber optic material mounted in longitudinal arcuate grooves 52A and 52B, respectively, formed in optically flat, confronting surfaces of rectangular bases or blocks 53A and 53B, respectively. The block 53A with the strand 50A mounted in the groove 52A will be referred to as the coupler half 51A, and the block 53B with the strand 50B mounted in the groove 52B will be referred to as the coupler half 51B.

The arcuate grooves 52A and 52B have a radius of curvature which is very large compared to the diameter of the fibers 50, and have a width slightly larger than the fiber diameter to permit the fibers 50, when mounted therein, to conform to a path defined by the bottom walls of the grooves 52. The depth of the grooves 52A and 52B varies from a minimum at the center of the blocks 53A and 53B, respectively, to a maximum at the edges of the blocks 53A and 53B, respectively. This advantageously permits the fiber optic strands 50A and 50B, when mounted in the grooves 52A and 52B, respectively, to gradually converge toward the center and diverge toward the edges of the blocks 53A,53B, thereby eliminating any sharp bends or abrupt changes in direction of the fibers 50 which may cause power loss through mode perturbation. In the embodiment shown, the grooves 52 are rectangular in cross-section, however, it will be understood that other suitable cross-sectional contours which will accommodate the fibers 50 may be used alternatively, such as a U-shaped cross-section or a V-shaped cross-section.

At the centers of the blocks 53, in the embodiment shown, the depth of the grooves 52 which mount the strands 50 is less than the diameter of the strands 50, while at the edges of the blocks 53, the depth of the grooves 52 is preferably at least as great as the diameter of the strands 50. Fiber optic material was removed from each of the strands 50A and 50B, e.g., by lapping, to form respective oval-shaped planar surfaces, which are coplanar with the confronting surfaces of the blocks 53A,53B. These oval surfaces, where the fiber optic material has been removed, will be referred to herein as the fiber "facing surfaces". Thus, the amount of fiber optic material removed increases gradually from zero towards the edges of the blocks 53 to a maximum towards the center of the blocks 53. This tapered removal of the fiber optic material enables the fibers to converge and diverge gradually, which is advantageous for avoiding backward reflection and excess loss of light energy.

In the embodiment shown, the coupler halves 51A and 51B are identical, and are assembled by placing the confronting surfaces of the blocks 53A and 53B together, so that the facing surfaces of the strands 50A and 50B are juxtaposed in facing relationship.

An index matching substance (not shown), such as index matching oil, is provided between the confronting surfaces of the blocks 53. This substance has a refractive index approximately equal to the refractive index of the cladding, and also functions to prevent the optically flat surfaces from becoming permanently locked together. The oil is introduced between the blocks 53 by capillary action.

An interaction region 54 is formed at the junction of the strands 50, in which light is transferred between the strands by evanescent field coupling. It has been found that, to ensure proper evanescent field coupling, the amount of material removed from the fibers 50 must be carefully controlled so that the spacing between the core portions of the strands 50 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 50 is within the critical zone, each strand receives a significant portion of the evanescent field energy from the other strand, and good coupling is achieved without significant energy loss. The critical zone includes that area in which the evanescent fields of the fibers 50A and 50B overlap with sufficient strength to provide coupling, i.e., each core is within the evanescent field of the other. However, as previously indicated, mode perturbation occurs when the cores are brought too close together. For example, it is believed that, for weakly guided modes, such as the $HE_{11}$ mode in single mode fibers, such mode perturbation begins to occur when sufficient material is removed from the fibers 50 to expose their cores. Thus, the critical zone is defined as that area in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown, the required center-to-center spacing between the strands 50 at the center of the coupler is typically less than a few (e.g., 2-3) core diameters.

Preferably, the strands 50A and 50B (1) are identical to each other; (2) have the same radius of curvature at the interaction region 54; and (3) have an equal amount of fiber optic material removed therefrom to form their respective facing surfaces. Thus, the fibers 50 are symmetrical, through the interaction region 54, in the plane of their facing surfaces, so that their facing surfaces are coextensive if superimposed. This ensures that the two fibers 50A and 50B will have the same propagation characteristics at the interaction region 54, and thereby avoids coupling attenuation associated with dissimilar propagation characteristics.

The blocks or bases 53 may be fabricated of any suitable rigid material. In one presently preferred embodiment, the bases 53 comprise generally rectangular blocks of fused quartz glass approximately 1 inch long, 1 inch wide, and 0.4 inch thick. In this embodiment, the fiber optic strands 50 are secured in the slots 52 by suitable cement, such as epoxy glue. One advantage of the fused quartz blocks 53 is that they have a coefficient of thermal expansion similar to that of glass fibers, and this advantage is particularly important if the blocks 53 and fibers 50 are subjected to any heat treatment during the manufacturing process. Another suitable material for the block 53 is silicon, which also has excellent thermal properties for this application.

The coupler of FIG. 2 includes four ports, labeled A, B, C, and D, which correspond to the ports 1, 2, 3, and 4, respectively, of the coupler 20 in FIG. 1. When viewed from the perspective of FIG. 2, ports A and B, which correspond to strands 50A and 50B, respectively, are on the left-hand side of the coupler, while the ports C and D, which correspond to the strands 50A and 50B, respectively, are on the right-hand side of the coupler. For the purposes of discussion, it will be assumed that input light is applied to port A. This light passes through the coupler and is output as port C and/or port D, depending upon the amount of power that is coupled between the strands 50. In this regard, the term "coupling constant" is defined as the ratio of the coupled power to the total output power. In the above example, the coupling constant would be equal to the ratio of the power at port D of the sum of the power output at ports C and D. This ratio is also referred to as the "coupling efficiency", and when so used, is typically expressed as a percent. Thus, when the term "coupling constant" is used herein, it should be understood that the corresponding coupling efficiency is equal to the coupling constant times 100. For example, a coupling constant of 0.5 is equivalent to a coupling efficiency of 50%.

The coupler may be "tuned" to adjust the coupling constant to any desired value between zero and 1.0, by offsetting the facing surfaces of the blocks 53. Such tuning may be accomplished by sliding the blocks 53 laterally relative to each other.

The coupler is highly directional, with substantially all of the power applied at one side of the coupler being delivered to the other side of the coupler. That is, substantially all of the light applied to input port A is delivered to the ports C and D, without contra-directional coupling to port B. Likewise, substantially all of the light applied to port B is delivered to the ports C and D. Further, this directivity is symmetrical, so that substantially all of the light applied to either port C or input port D is delivered to the ports A and B. Moreover, the coupler is essentially non-discriminatory with respect to polarizations, and thus, preserves the polarization of the light. Thus, for example, it a light beam having a vertical polarization is input to port A, the light cross-coupled from port A to port D, as well as the light passing straight through from port A to port C, will remain vertically polarized.

Light that is cross-coupled from one of the fibers to the other undergoes a phase shift of $+\pi/2$, while light that is not cross-coupled is not shifted in phase during propagation through the coupler. Thus, for example, if light is input to port A, the cross-coupled light of port D will be advanced in phase by $\pi/2$, while the light passing straight through to port C remains unchanged in phase.

The coupler is also a low loss device, having insertion or throughput losses typically on the order of 2-3 percent. The term "insertion loss", as used herein, refers to the real scattering losses of light passing through the coupler, from one side to the other. For example, if light is applied to port A, and 97% of that light reaches ports C and D (combined), the insertion loss would be 0.03 (3%). The term "coupler transmission" is defined as one minus the insertion loss. Thus, if the insertion loss is 0.03 (3%), the coupler transmission is 0.97 (97%).

THE POLARIZATION CONTROLLER 40

One type of polarization controller suitable for use as the polarization controller 40 of FIG. 1 is described in copending patent application Ser. No. 183,975, filed 9/3/80, entitled FIBER OPTIC POLARIZATION CONTROLLER, assigned to the assignee of the present invention. In addition, such a polarization controller is described in the Sept. 25, 1980 issue of *Electronics Letters*, Vol. 16, No. 20, pages 778 to 780. This patent application and publication are hereby incorporated by reference herein.

Figure 3:
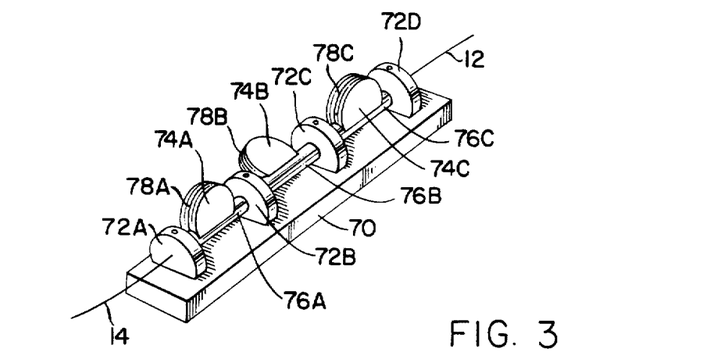
FIG. 3 is a perspective view of one embodiment of a fiber optic polarization controller for use in the resonator of FIG. 1.

As illustrated in FIG. 3, the controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76, with the axes of the spools 74 perpendicular to the axes of the shafts 76. The fiber portion 14 (FIG. 1) extends through axial bores in the shafts 76 and is wrapped about each of the spools 74 to form three coils 78A through 78C. The radii of the coils 78 are such that the fiber 14 is stressed to form a birefringent medium in each of the coils 78. The three coils 78A through 78C may be rotated independently of each other about the axes of the shafts 74A through 74C, respectively, to adjust the birefringence of the fiber 14 and, thus, control the polarization of the light passing through the fiber 14.

The diameter and number of turns in the coils 78 are such that the outer coils 78A and C provide a spatial delay of one-quarter wavelength, while the central coil 78B provides a spatial delay of one-half wavelength. The quarter wavelength coils 78A and C control the ellipticity of the polarization, and the half wavelength coil 78B controls the direction of polarization. This provides a full range of adjustment of the polarization of the light propagating through the fiber portion 14. It will be understood, however, that the polarization controller may be modified to provide only the two quarterwave coils 78A and C, since the direction of polarization (otherwise provided by the central coil 78B) may be controlled indirectly through proper adjustment of the ellipticity of polarization by means of the two quarterwave coils 78A and C. Accordingly, the polarization controller 40 is shown in FIG. 1 as including only the two quarterwave coils 78A and C. Since this configuration reduces the overall size of the controller 40, it may be advantageous for certain applications of the present invention involving space limitations.

Thus, the polarization controller 40 provides means for establishing, maintaining, and controlling the polarization of light propagating through the fiber portion 14.

OPERATION OF THE RESONATOR

Referring again to FIG. 1, in operation, light introduced from the source 22 into the fiber portion 12 propagates to port 1 of the coupler 20, where a portion of the light is coupled to port 4, with the remaining portion propagating to port 3. The light at port 4 propagates through the fiber portion 16, and out of the end of the fiber 10. However, the light at port 3 traverses the loop portion 14 and again enters the coupler at port 2, where a portion is coupled to port 3 while the remaining portion propagates to port 4, and through the fiber portion 16. It will be seen that the loop 14 and coupler 20 cooperate to provide a resonant cavity so that light entering the coupler at port 2 interferes with incoming light from the laser source 22. Such interference is constructive at port 3, while being destructive at port 4, thereby causing light to build up in the resonant cavity loop.

Hereinafter, the light from the source 22, propagating through the fiber portion 12 to port 1, will be referred to as the input signal wave $W_i$, while light exiting port 4, for propagation through the fiber portion 16, will be referred to as the output signal wave $W_o$. The light circulating in the loop portion 14 will be referred to as the circulating wave $W_c$.

As the circulating wave $W_c$ propagates about the loop 14, from port 3 to port 2, a fractional amount of its power will be lost, due to fiber transmission losses. The term "fiber transmission losses" is defined as the fractional loss during propagation through the fiber, from port 3 to port 2. In the embodiment shown, the fiber transmission losses are purely a function of fiber attenuation, so that the power or intensity of the wave $W_c$ at port 2 is equal to the power of the wave $W_c$ at port 3 times the quantity $\exp(-2\alpha_0 L)$, where L is the optical path length of the loop 14 for light circulating therethrough, excluding any phase shift of the coupler 20, and $\alpha_0$ is the amplitude attenuation coefficient of the fiber 10. It will be understood that, if an additional component (e.g., a fiber optic polarizer) is placed in the fiber loop, the losses attributable to this component are included within the definition of fiber transmission losses. In addition, the term "fiber transmission" is defined as the circulating wave power at port 2 divided by the circulating wave power at port 3. Stated another way, it is a fractional amount of power from port 3 that reaches port 2 (i.e., fiber transmission equals 1 − fiber transmission losses).

In addition to being attenuated by fiber transmission losses, the circulating wave $W_c$ will be degraded slightly on each pass through the coupler 20, due to coupler insertion losses. Further, the power or intensity of the input wave $W_i$ will experience a loss, due to coupler insertion losses, during propagation through the coupler 20. In this regard, the coupler 20 may be modeled as a lossless device with an added lumped insertion loss ($\gamma_0$) that is independent of the coupling constant. The relationship between the coupler insertion loss and the complex amplitudes at each of the four ports of the coupler 20 is:

$$|E_3|^2 + |E_4|^2 = (1-\gamma_0)(|E_1|^2 + |E_2|^2) \tag{1}$$

where: $E_1$, $E_2$, $E_3$, and $E_4$ are the complex electric field amplitudes at the coupler ports 1, 2, 3, and 4; and $\gamma_0$ is the coupler insertion loss (typically on the order of 2% to 10%).

The complex amplitudes at ports 3 and 4, after the coupled-mode interaction, are related to the field amplitudes at ports 1 and 2 as follows:

$$E_3 = (1 - \gamma_0)^{\frac{1}{2}}(1 - K)^{\frac{1}{2}} E_1 + j\sqrt{K}\, E_2 \tag{2}$$

and, $$E_4 = (1 - \gamma_0)^{\frac{1}{2}} j\sqrt{K}\, E_1 + (1 - K)^{\frac{1}{2}} E_2 \tag{3}$$

where K is the intensity coupling constant. No coupling corresponds to K=0, whereas K=1 provides full coupling. $E_2$ and $E_3$ are further related in that:

$$E_2 = E_3 e^{-\alpha_0 L} e^{j\beta L} \tag{4}$$

where:

$$\beta = n\omega/c \tag{5}$$

and: $\alpha_0$ is the amplitude attenuation coefficient of the fiber; L is the length of the fiber loop portion 14; n is the effective refractive index of the fiber; $\omega$ is the optical frequency; $\beta$ is the propagation constant of the fiber 10; and c is the speed of light.

For full resonance, the output wave $W_o$ should be zero, and thus, the ratio $E_4/E_1$ should be zero. Accordingly, by solving Equations 2, 3, and 4, for $E_4/E_1$ in terms of $\gamma_0$, K, $\alpha_0 L$, and $\beta L$, and setting $E_4/E_1$ equal to zero, the conditions for resonance, in terms of the loop length L and the coupling constant K, may be found. One of the conditions necessary for resonance is that:

$$\beta L = q2\pi - \pi/2 \tag{6}$$

where q is any integer.

Thus, for full resonance, the total phase delay ($\beta L$) around the loop 14, excluding any phase shift due to the coupler 20, must equal an integral number of $2\pi$ radians, less $\pi/2$.

Note that, from Equations 2 and 3, the directional coupler 20 has a $+\pi/2$ phase shift. By adding this phase shift to $\beta L$ in Equation 6, it may be seen that the total accumulated phase of the circulating wave $W_c$, as it traverses the loop 14 (e.g., from an arbitrary point on the loop, around the loop, back to that arbitrary point) is equal to $q(2\pi)$. As will be understood from a subsequent discussion, the loop length may be adjusted to satisfy this resonant condition, after assembly of the resonator, by mechanically stretching the fiber 14 using an electrically driven PZT cylinder, about which the fiber 14 is wrapped.

Figure 4:
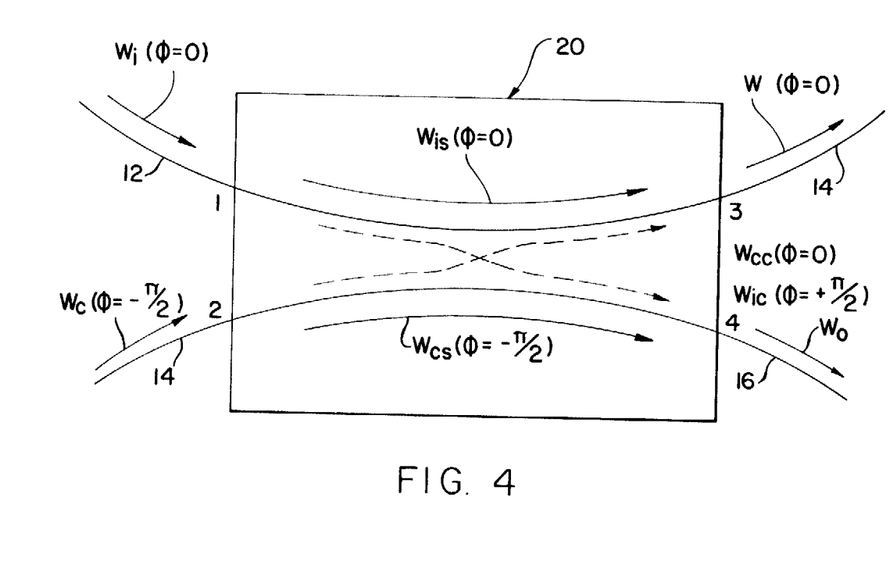
FIG. 4 is a schematic view of the fiber optic directional coupler shown in FIGS. 1 and 2, illustrating the phases of the lightwave components propagating therethrough.

The resonant condition, defined by Equation 6, may be more fully understood through reference to FIG. 4, which shows the manner in which the $\pi/2$ phase shift of the coupler 20 is advantageously utilized to provide constructive interference at port 3, and destructive interference at port 4. For purposes of discussion, the coupler 20 may be viewed as having a point of effective coupling at the center of the coupler 20, with the ports 1, 2, 3, and 4 equidistant from this point and spaced therefrom by an integral number of wavelengths. The loop length (L) may be viewed as the distance from the coupling point, around the loop 14, and back to the coupling point, which, for resonance, should be q-¼ wavelengths, where q is an integer.

In regard to FIG. 4, the input signal wave $W_i$ will be assumed to be a reference wave having zero phase, and that the phases of all of other waves (i.e., $W_c$ and $W_o$) are defined relative to the input wave $W_i$. Further, any wave propagating through the coupler 20 will be divided into two components, namely, a "cross-coupled" component will be designated by the subscript "c", and a "straight through" component, which will be designated by the subscript "s". Thus, the input wave $W_i$ will be divided into a cross-coupled component $W_{ic}$, which propagates from port 1 to port 4, and a straight through component $W_{is}$ which propagates from port 1 to port 3. Similarly, the wave $W_c$ will be divided into a cross-coupled component $W_{cc}$, which propagates from port 2 to port 3, and a straight through component $W_{cs}$, which propagates from port 2 to port 4.

Assuming the source 22 is turned on at t=0, the input wave $W_i$ will enter port 1 of the coupler 20, with zero phase, for propagation therethrough. The cross-coupled component $W_{ic}$ will undergo a $+\pi/2$ phase shift during propagation to the port 4, while the straight through component $W_{is}$ will remain unchanged in phase during propagation to port 3. Thus, the light wave $W_c$ at port 3 will have a phase of zero. This wave $W_c$ then propagates about the loop 14 towards port 2. Assuming that the loop length L is chosen in accordance with Equation 6, the wave $W_c$, upon reaching port 2, will have a phase of $-\pi/2$. During propagation of the wave $W_c$ through the coupler 20, the cross-coupled component $W_{cc}$ undergoes a $+\pi/2$ phase shift, so that, upon reaching port 3, its phase is zero, the same as that of the input wave component $W_{is}$. Thus, the circulating wire component $W_{cc}$ will constructively interfere with the input wave component $W_{is}$ at port 3, thereby increasing the intensity of the circulating wave $W_c$ at port 3. The straight through component $W_{cs}$ of the circulating wave $W_c$, on the other hand, does not change in phase as it propagates from port 2 to port 4, so that, at port 4, its phase will still be $-\pi/2$. Thus, this component $W_{cs}$ will destructively interfere with the cross-coupled input light component $W_{ic}$, which has a phase of $+\pi/2$.

Figure 5:
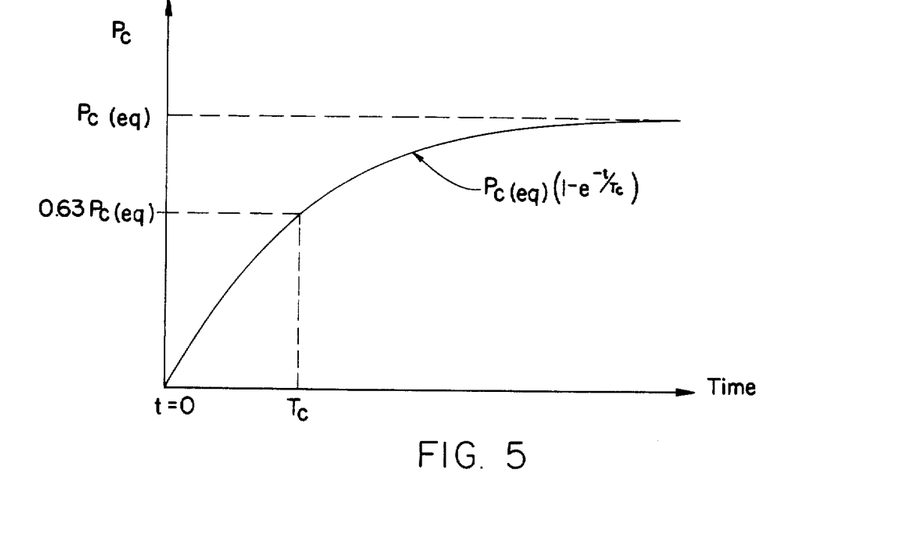
FIG. 5 is a graph of circulating power as a function of time, showing the circulating power asymtotically building up to an equilibrium value over a time period equal to the cavity rise time.

Consequently, as the wave $W_c$ circulates through the loop 14, it will constructively interfere with the input signal wave $W_i$ at port 3, and destructively interfere therewith at port 4, thereby gradually (and asymtotically) building up the power (intensity) $P_c$ of light circulating in the loop 14 until an equilibrium value $P_{c(eq)}$ is reached, as shown in FIG. 5. The time required for such light to build up to 63% (i.e., $1-e^{-1}$) of the equilibrium value is defined as the cavity rise time ($T_c$), also commonly referred to as the cavity decay time.

In order to achieve full resonance at the equilibrium value, and thus, zero output power at port 4, a second condition must be satisfied, namely, the straight through circulating wave component $W_{cs}$ at port 4 must have an amplitude equal to the amplitude of cross-coupled input signal component $W_{ic}$ at port 4. For this to occur, the coupling constant K is adjusted to a value $K_r$, which will be referred to hereinafter as the "resonant coupling constant". By solving Equations 2, 3, and 4 for $E_4/E_1$, and setting $E_4/E_1$ equal to zero (which is the condition for resonance), the resonant coupling constant $K_r$ may be found to be:

$$K_r = (1-\gamma_0) \exp(-2\alpha_0 L) \tag{7}$$

In the embodiment shown, the coupler transmission is $1-\gamma_0$ and the fiber transmission is $\exp(-2\alpha_0 L)$. Thus, $$K_r = \text{coupler transmission} \times \text{fiber transmission} \tag{8}$$

For the embodiment disclosed, the fiber attenuation is 8.3 dB/km, the loop 14 is 10 meters, so $2\alpha_0 L$ equals 0.0158 at a wavelength of 632.8 nm. With a coupler insertion loss of 1.8%, this yields a resonant coupling constant of 0.967.

Using the resonant coupling constant defined by Equation 7, Equations 2, 3, and 4 yield the following circulating power (intensity) and output power (intensity), normalized with respect to input power:

$$\left|\frac{E_3}{E_1}\right|^2 = \frac{P_{c(3)}}{P_i} = \frac{(1-\gamma_0)(1-K_r)}{(1+K_r)^2 - 4K_r\mathrm{Sin}^2(\beta L/2 - \pi/4)} \quad (9)$$

$$\left|\frac{E_4}{E_1}\right|^2 = \frac{P_o}{P_i} = \quad (10)$$

$$(1-\gamma_0)\left[1 - \frac{(1-K_r)^2}{(1+K_r)^2 - 4K_r\mathrm{Sin}^2(\beta L/2 - \pi/4)}\right]$$

where $P_{c(3)}$ is the power (intensity) of the circulating wave $W_c$ at port 3; $P_i$ is the power (intensity) of the input signal wave $W_i$; and $P_o$ is the power (intensity) of the output wave $W_o$ at port 4.

If $\beta L$ is chosen to satisfy the resonant condition defined by Equation 6, Equation 9 reduces to:

$$\left|\frac{P_c}{P_i}\right|_{max} = \frac{1-\gamma_0}{1-K_r} \quad (11)$$

This equation may be rewritten as:

$$P_i = P_c(1-K_r) + P_i\gamma_0 \quad (12)$$

If Equation 6 is satisfied, $1-K_r$ is equal to the round-trip fractional intensity loss for the circulating wave $W_c$, (i.e., coupler insertion loss plus fiber transmission loss). Thus, the right-hand side of Equation 12 represents the total power dissipated in the coupler 20 and loop 14. Accordingly, it may be seen from Equation 12 that, at full resonance, the circulating power $P_c$ is such that the total power dissipated in the loop and coupler equals the input power $P_i$ at port 1.

Figure 6:
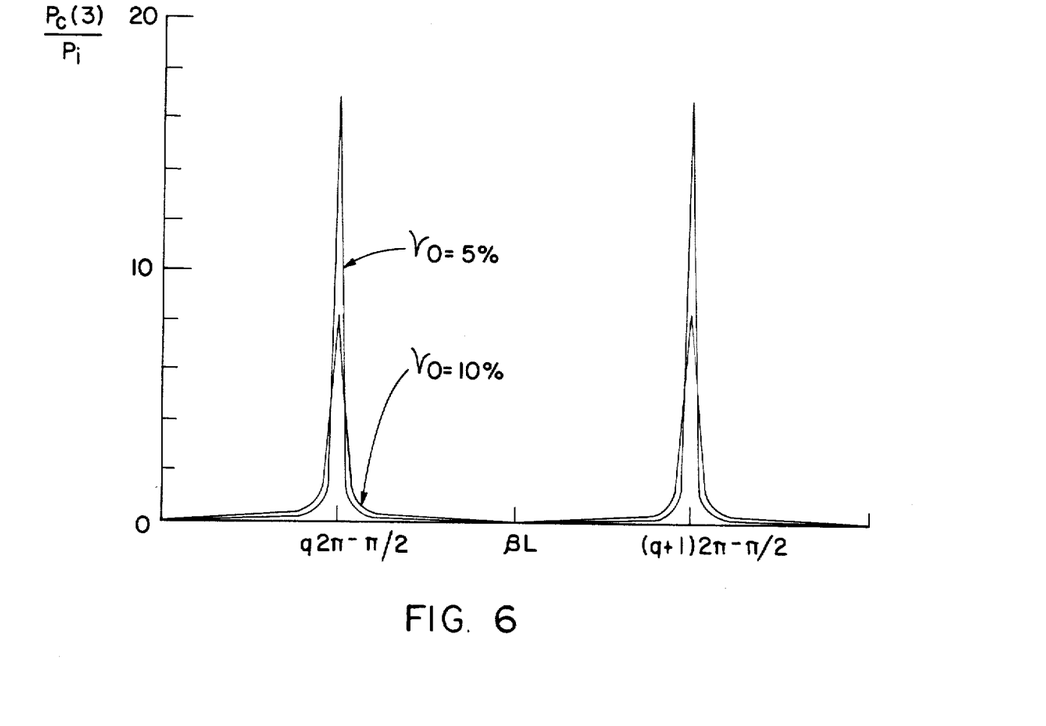
FIG. 6 is a graph of the circulating power at port 3, normalized with respect to the input power, as a function of the phase delay through the fiber loop, showing the normalized circulating power at resonance for exemplary coupler insertion losses of 5% and 10%.
Figure 7:
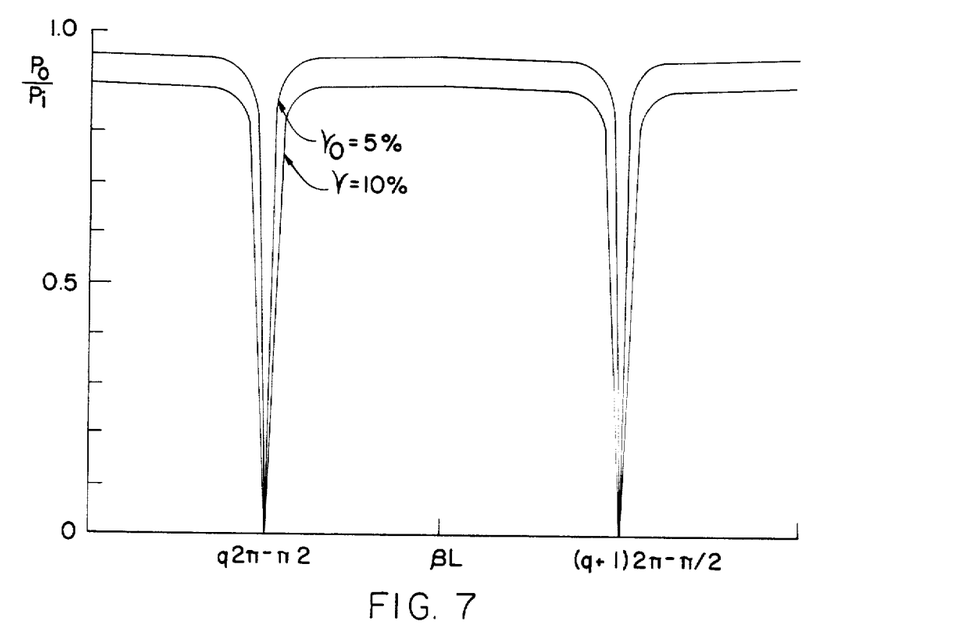
FIG. 7 is a graph of output power, normalized with respect to input power, as a function of the phase delay through the fiber loop, showing zero output power at resonance for both exemplary coupler insertion losses of 5% and 10%.

The theoretical normalized circulating power and output power, defined by Equations 9 and 10, respectively, are shown as a function of $\beta L$ for two exemplary coupler insertion loss values, namely, 5% and 10%, in FIGS. 6 and 7, respectively. Although these curves are for a loop length of 3 meters ($2\alpha_0 L=0.0057$), it will be understood that similar curves may be developed for a 10-meter loop length. As shown in FIG. 6, circulating power $P_c$ is highly dependent upon coupler insertion losses, being about 9 times the input power $P_i$ for an insertion loss of 10%, and almost 19 times input power $P_i$ for an insertion loss of 5%. The output power $P_o$, in contrast, drops to zero at full resonance in either case, as shown in FIG. 7. However, it will be seen that the minima and maxima of FIGS. 6 and 7 become sharper as insertion loss decreases, indicating that cavity finesse is highly dependent upon coupler insertion loss.

The cavity finesse (F) may be defined as:

$$F = FSR/\delta f \quad (13)$$

Where FSR is the free spectral range of the resonant cavity (i.e., the distance between the minima (FIG. 7) or the maxima (FIG. 6)); and $\delta f$ is the width of the circulating power maxima (FIG. 6) at one-half of the maximum circulating power (i.e., at one-half power at full resonance). The free spectral range (FSR) may be defined as:

$$FSR = c/nL \quad (14)$$

By setting Equation 9 equal to one-half $|P_{c(3)}/P_i|$ max, the full width at half maximum may be found:

$$\delta f = \frac{c}{nL}\left\{1 - \frac{2}{\pi}\mathrm{Sin}^{-1}\left[1 - \frac{(1-K_r)^2}{4K_r} \approx \frac{1}{2}\right]\right\} \quad (15)$$

For $K_r$ near unity, $\delta f$ may be approximated as:

$$\delta f = \frac{c}{nL} \frac{1-K_r}{\pi\sqrt{K_r}} \quad (16)$$

This approximation is within 0.2% for $K_r$ greater than 0.8.

Substituting Equation 14 and 16 into Equation 13, the cavity finesse is therefore:

$$F = \frac{\pi\sqrt{K_2}}{1-k_2} \quad (17)$$

It will be recalled from Equation 8 that the resonant coupling constant ($K_r$) is equal to the product of coupler transmission and fiber transmission, so that the quantity $1-K_r$ is equal to the total fractional losses around the loop 14. It may be seen from Equation 17 that, as these fractional losses decrease, the finesse increases. Thus, the finesse is highly dependent upon losses, and may be increased by decreasing either the coupler insertion losses or the fiber transmission losses, or both. For the embodiment shown, the finesse is about 80 and the free spectral range for the 10-meter loop 14 is about 20.6 MHz.

Finally, referring back to FIG. 5, the cavity rise time $T_c$ may be approximated as follows:

$$T_c = \frac{nL/c}{2(1-K_r)} \quad (18)$$

For resonant effects, the laser source 22 should have a coherence length greater than $cT_c$.

Figure 8:
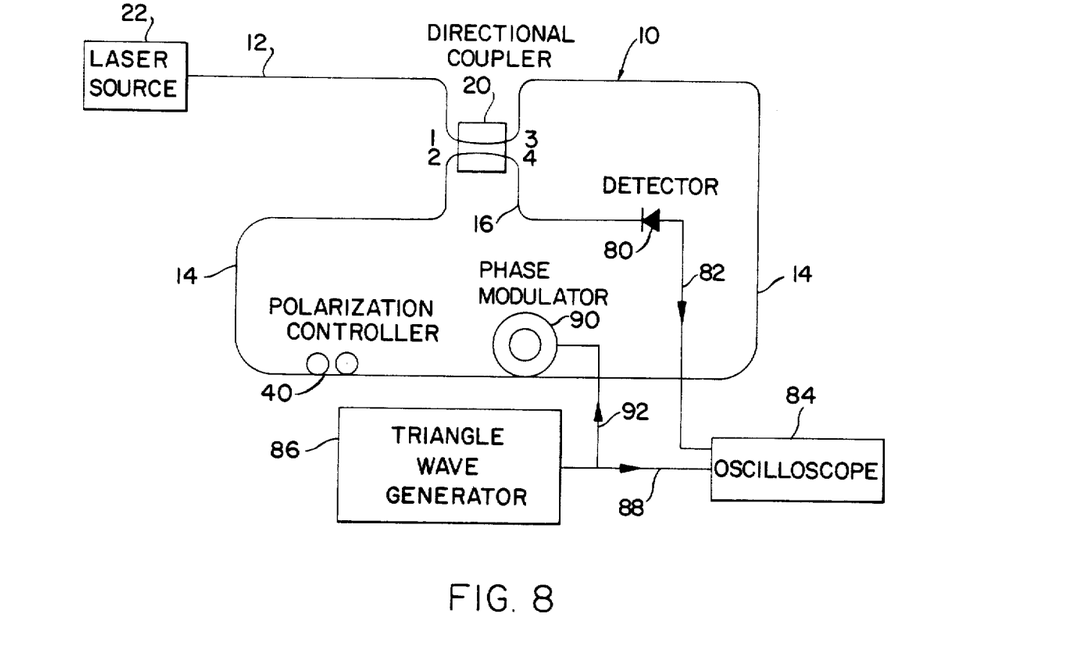
FIG. 8 is a schematic drawing of one embodiment of the resonator of FIG. 1.

Referring to FIG. 8, the resonant effects predicted by Equations 9 and 10 may be observed by providing a detector 80 for measuring the optical power (intensity) of the output wave $W_o$ at the end of the fiber portion 16. The detector 80 outputs an electrical signal, on a line 82, which is proportional to the optical intensity of the output wave $W_o$. This line 82 is connected to input such signal to an oscilloscope 84. A signal from a triangle wave generator 86 is provided to the oscilloscope 84 on a line 88, and to a phase modulator 90 on a line 92. By way of specific example, the phase modulator may comprise a PZT cylinder having a 3-inch diameter, about which a portion of the fiber loop 14 is wrapped 26 times. The signal from the trianglewave generator 86 drives the PZT cylinder 90 to expand radially, and thus, linearly stretch the fiber 14 to periodically vary the fiber length (L) at the generator 86 frequency. In this configuration, the behavior of the fiber resonator is somewhat analogous to that of a scanning Fabry-Perot interferometer.

Figure 9:
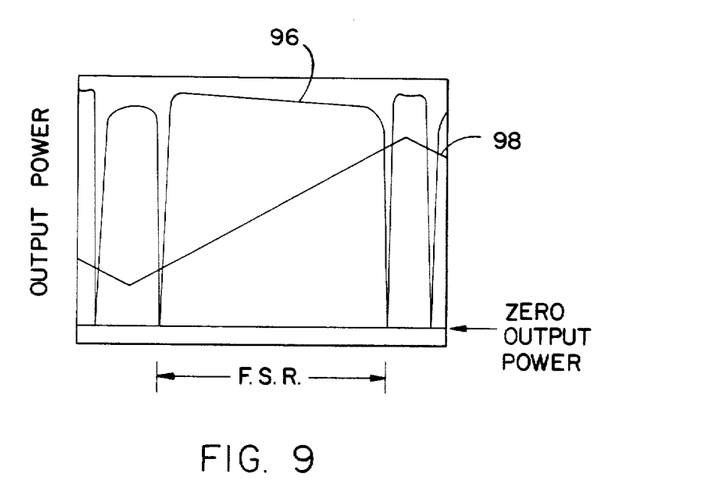
FIG. 9 is a graph illustrating resonant behavior for the embodiment shown in FIG. 8.

FIG. 9 shows the oscilloscope traces of the detector current 96, representing the optical output power ($P_o$), and the triangular wave generator signal 98, representing the amount that the fiber is stretched by the phase modulator 90. The amount of fiber elongation provided by the signal 98 is slightly more than a wavelength, so that the output power shown in FIG. 9 drops to zero twice during each linear stretch of the fiber, thus demonstrating resonant behavior. If the coupling constant is varied slightly from the resonant coupling constant $K_r$, non-zero output power is observed at the minima of the curve 96.

Figure 10:
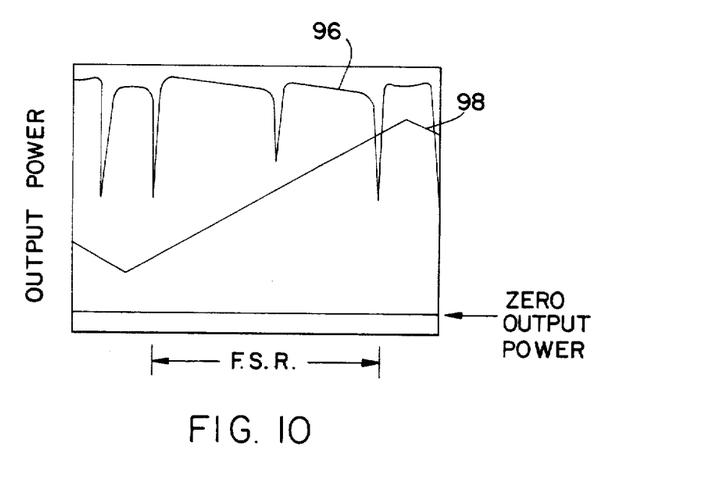
FIG. 10 is a graph, similar to that of FIG. 9, showing the effect, upon resonant behavior, of misaligning the polarization controller so that light propagates in both polarization modes.

The importance of maintaining polarization of light in the fiber loop 14, e.g., by means of the polarization controller 40, it is illustrated in FIG. 10, which shows the results of rotating the quarterwave loops of the polarization controller 40 away from the optimum position. As shown therein, two resonant modes, corresponding to the two independent polarization modes, are observed. The two modes resonate at different scanned positions due to slightly different propagation velocities. Each of the resonant modes has non-zero output power because, when one mode is resonating the other is not, and thus, the output power of a non-resonant mode is observed at resonance of either mode.

OPERATION AS A BRILLOUIN RING LASER

The above-described resonator operates as a Brillouin ring laser by adjusting the loop length L and coupling constant $K_r$ for full resonance and increasing the power of source 22 above a threshold level. In such case, the source 22 serves as a pump for stimulated Brillouin oscillation in the fiber loop 14. Accordingly, the input lightwave $W_i$ and circulating light $W_c$ will be referred to hereinafter as the "pump light".

When the pump power ($P_c$) circulating through the resonant cavity formed by the loop 14 reaches a threshold level, such pump light causes the molecules of the glass fiber to vibrate at a predetermined acoustic frequency. This acoustic frequency is a function of the fiber material and the wavelength of the pump light. For a quartz fiber and a pump wavelength of 632.8 nm, the acoustic frequency is about 27.6 giga Hz.

The acoustic wave travels through the fiber in the same direction as the pump light. Once the acoustic wave is present, the circulating pump light interacts with the acoustic wave to cause Brillouin scattering. The Brillouin scattering process is somewhat analogous to Bragg scattering, in that the acoustic wave acts as a diffraction grating for the pump light. Light which is backscattered off of the acoustic wave constructively interferes to provide a Brillouin wave, which counterpropagates relative to the pump light. Since the acoustic wave is moving in the same direction as the pump light, the backscattered light or Brillouin wave receives a doppler shift, so that its frequency is less than the frequency of the pump light. If the pump light frequency is $f_p$, and the acoustic wave frequency is $f_a$, the Brillouin wave frequency $f_b$ will be:

$$f_b = f_p - f_a \qquad (19)$$

In effect, the pump light is converted into a Brillouin light wave which is downshifted in frequency with respect to the pump wave by an amount equal to the frequency of the acoustic wave. It will be understood that the foregoing description of Brillouin scattering is over-simplified, and that a more complete description may be found in publications, such as *Quantum Electronics*, by Amnon Yariv, 2nd Ed., 1975, John Wiley and Sons, pages 490-498.

As the Brillouin wave circulates through the resonant cavity, a fractional amount of its power will be lost during each circulation, due to fiber transmission losses and coupler insertion losses. In addition to the above-described losses, a small fraction (i.e., $1-K_r$) of the Brillouin power in the fiber loop 14 will exit the fiber loop, and be lost at port 1, since the coupling constant $K_r$ is less than 1.0. This loss, together with the coupler insertion loss and fiber transmission loss, will be referred to collectively as the "combined losses", which are the total fractional losses for the Brillouin wave per circulation about the closed loop 14.

The term "Brillouin transmission" will be used to refer to the fractional Brillouin power transmitted during one round trip (i.e., one complete circulation) through the fiber cavity, so that:

$$\text{Brillouin transmission} = 1 - \text{combined loss} \qquad (20)$$

For sustained Brillouin oscillation to occur, the gain of the laser must at least compensate for the combined losses. Therefore, the threshold condition for sustained Brillouin oscillation is:

$$\text{Brillouin transmission} \times \text{Brillouin gain} = 1 \qquad (21)$$

The stimulated Brillouin scattering gain along a fiber of length L is:

$$\text{Brillouin gain} = \exp(gP_c L_{\text{eff}}/A) \qquad (22)$$

where g is the Brillouin gain coefficient fiber, $P_c$ is the circulating pump power, A is the effective core area of the fiber, and $L_{\text{eff}}$ is the effective gain length (i.e., the length of a lossless fiber yielding the same Brillouin gain as a fiber having an attenuation coefficient of $\alpha_0$).

$L_{\text{eff}}$ may be expressed as:

$$L_{\text{eff}} = [1 - \exp(-2\alpha_0 L)]/2\alpha_0 \qquad (23)$$

The round trip transmission of the Brillouin wave (assuming no gain) is the product of fiber transmission, i.e., $\exp(-2\alpha_0 L)$, and the net coupler transmission from port 3 to port 2, i.e., $(1-\gamma_0)K_r$. Thus, the stimulated Brillouin wave round trip transmission is:

$$\text{Brillouin transmission} = K_r(1 - \gamma_0) \exp(-2\alpha_0 L) \qquad (24)$$

It will be recalled that:

$$K_r = (1 - \gamma_0) \exp(-2\alpha_0 L) \qquad (25)$$

Thus, substituting Equation 25 into Equation 24, yields:

$$\text{Brillouin transmission} = [(1 - \gamma_0) \exp(-2\alpha_0 L)]^2 \qquad (26)$$

Finally, substituting Equations 22 and 26 into Equation 21, yields:

$$[(1-\gamma_0) \exp(-2\alpha_0 L)]^2 \exp(gP_c L_{\text{eff}}/A) = 1 \qquad (27)$$

For relatively small coupler insertion losses (e.g., less than 0.2), the quantity $(1-\gamma_0)$ may be approximated as $\exp(-\gamma_0)$. Further, if the length (L) of the fiber loop 14 is relatively small (e.g., less than 100 meters), the quantity $(1-2\alpha_0 L)$ may be approximated as $\exp(-2\alpha_0 L)$, an therefore, $L_{eff}$ may be approximated as L. Using these approximations, Equation 27 may be solved for the threshold circulating pump power, $P_c$:

$$P_c, \text{threshold} = \frac{2A}{gL}(\gamma_0 + 2\alpha_0 L) \quad (28)$$

Recalling that the ratio of the circulating pump power ($P_c$) to the input pump power ($P_c$) is defined by:

$$\frac{P_c}{P_1} = \frac{1-\gamma_0}{1-K_r} \quad (29)$$

Substituting Equation 29 into Equation 28, yields the following threshold input pump power $P_i$:

$$P_i, \text{threshold} = \frac{2A}{gL} \frac{(\gamma_0 + 2\alpha_0 L)^2}{(1-\gamma_0)} \quad (30)$$

Thus, for sustained Brillouin oscillation, the theoretical threshold pump power must be equal to or greater than that defined by Equation 30. In practice, it has been found that the actual threshold pump power is about 2.6 times greater than this theoretical threshold pump power. It is believed that this discrepancy is due to fiber birefringence causing the pump and Brillouin shifted waves, which travel in opposite directions, to have unmatched polarizations. Thus, the use of a low loss polarization maintaining fiber for the fiber 10 (FIG. 1) shouldd bring experimental results closer to theoretical values.

By minimizing Equation 30 with respect to L, the optimum fiber length ($L_{opt}$) for minimum input threshold pump power may be found to be:

$$L_{opt} = \gamma_0/2\alpha_0 \quad (31)$$

Accordingly, for minimum input threshold pump power, the fiber loop length (L) should be chosen such that the fiber transmission loss per circulation ($2\alpha_0 L$) equals the coupler insertion loss per circulation ($\gamma_0$). For the embodiment shown, the optimum fiber length (L) is on the order of 10 meters.

The Brillouin ring laser of the present invention is particularly suitable for use as a rotation sensor for, e.g., inertial navigation purposes. As discussed in detail below in reference to FIG. 12, pump power is introduced into both parts 1 and 4 of the coupler 20 to provide counter-propagating Brillouin waves in the loop 14. Upon rotation of the loop about an axis perpendicular to its plane, one of the Brillouin waves is upshifted in frequency, while the other is downshifted, thereby providing a frequency difference ($\Delta f$) therebetween. The rotation rate ($\Omega$) is a function of the frequency difference:

$$\Omega = \Delta f \frac{c}{2nrf} \quad (32)$$

where: $\Delta f$ is the frequency difference; c is the free space velocity of light; n is the equivalent refractive index of the fiber; r is the radius of the fiber loop; and f is the frequency of the Brillouin wave.

Figure 11A:
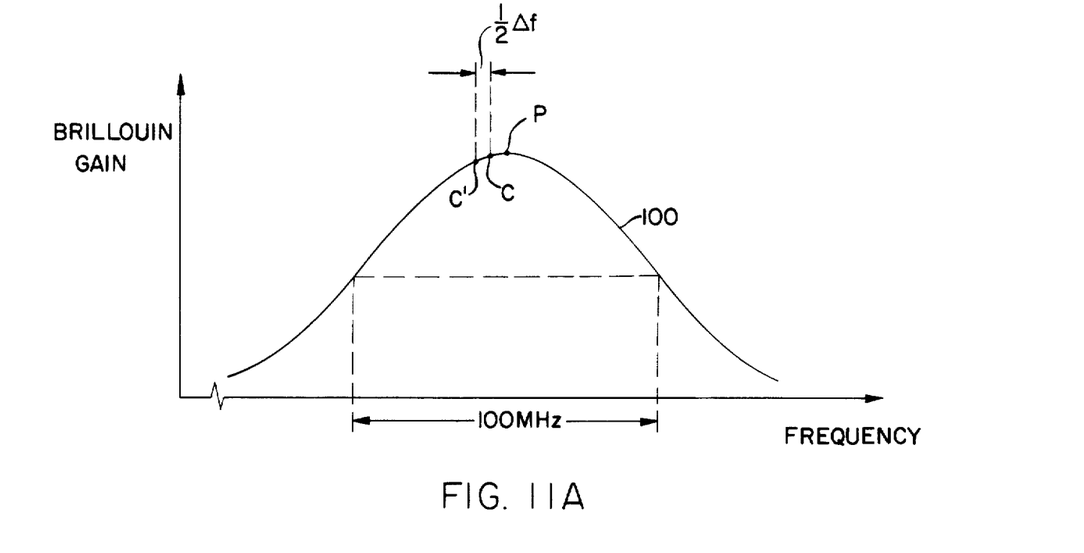
FIG. 11a is a graph of an exemplary Brillouin gain curve for quartz fibers.
Figure 11B:
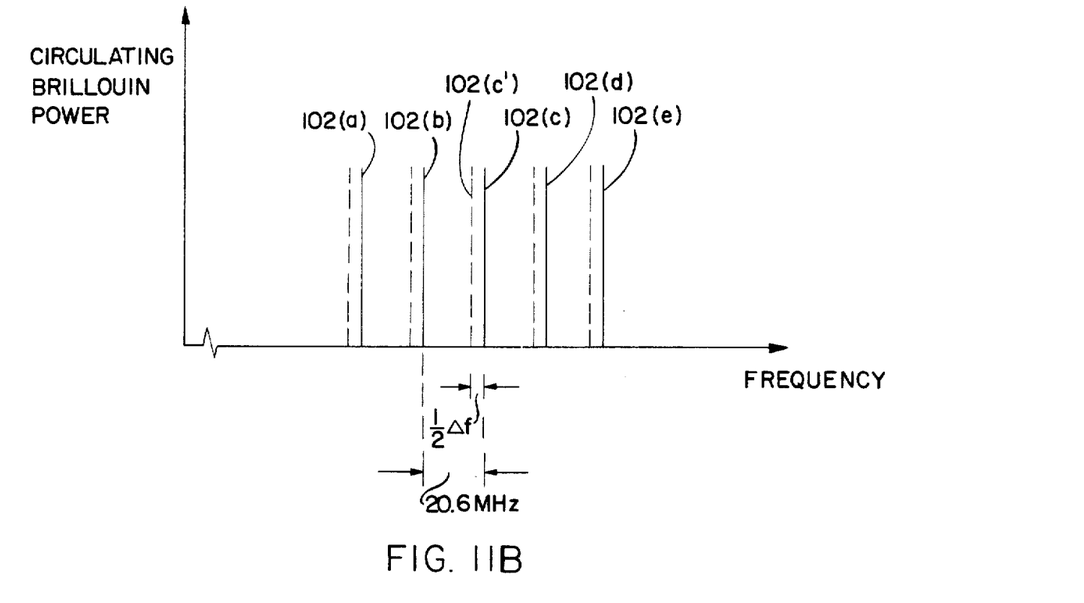
FIG. 11*b* is a graph of Brillouin power circulating in the loop as a function of frequency, showing the resonant frequencies of the loop.

The reason for the frequency shift of the Brillouin waves may be more fully understood through reference to FIGS. 11a and 11b. FIG. 11a illustrates the Brillouin gain curve 100 for a typical emission line of quartz fibers as a function of frequency. As shown therein, and discussed in detail in "Brillouin Spectrum of Single Mode Optical Fibers", Applied Physics Letters, Vol. 34, pg. 139 (1979), the Brillouin gain linewidth (i.e., full width at half maximum) for quartz fibers is approximately 100 MHz. FIG. 11b is a plot of normalized Brillouin circulating power as a function of frequency, with the frequency corresponding to FIG. 11a (i.e., a plot of resonant frequencies 102 of the loop). Within the Brillouin gain linewidth of FIG. 11a, a continuum of frequencies is potentially present. However, it will be understood that stimulated Brillouin emission will occur only at the resonant frequencies 102(a)–(e) of the loop 14, since only these frequencies circulate in the loop. Since the free spectral range (FSR) of the resonant cavity loop 14 is substantially less (e.g., 20.6 MHz) than the Brillouin gain curve linewidth (e.g., 100 MHz), plural resonant frequencies 102(a)–(e) exist within the linewidth. This, a buildup of Brillouin light will occur in the loop at one of the loop resonant frequencies 102(a)–(e) within the Brillouin gain linewidth. Further, among these resonant frequencies 102(a)–(e) of the loop, only that frequency 102(c) having the highest Brillouin gain will be present, the Brillouin laser being a homogenous type of laser. When the loop 14 is at rest, both Brillouin waves will, therefore, have a frequency at the cavity resonant point (c) (corresponding to resonant frequency 102(c)), nearest the peak of the Brillouin gain curve.

Upon rotation of the loop 14, each of the counter-propagating Brillouin waves will have a different optical path length around the loop 14, due to the Sagnac effect, the path length for one of the waves increasing, while the path length for the other wave decreases. This change in path length shifts the cavity resonant frequencies 102(a)–(e) for each of the waves. For the wave propagating in the direction of increased path length, the resonant frequencies are downshifted by an amount $\frac{1}{2}\Delta f$, as shown (exagerated) in dotted lines in FIG. 11b. For the wave propagating in the direction of decreased path length, the resonant frequencies are upshifted by the same amount. Thus, a pair of new Brillouin waves will arise at these shifted resonant frequencies, while the Brillouin waves at the former resonant frequency will simultaneously diminish because they are no longer resonant in the cavity. For example, the downshifted wave will occur at a cavity resonant point ($c'$) in FIG. 11a, corresponding to the shifted resonant frequency 102($c'$), shown in dotted lines in FIG. 11b. Consequently, during rotation of the loop 14, the Brillouin waves will each have a different frequency, one upshifted from the frequency when the loop is at rest, while the other is downshifted. It is emphasized that the above-described process takes place very rapidly, so that the frequency of the Brillouin waves is extremely responsive to rotation. It should be noted that the shift in resonant frequency caused by loop rotation is small enough to prevent non-resonance of the pumping illumination from laser source 22.

Thus, by detecting this frequency difference ($\Delta f$), the rotation rate may be ascertained. It will be seen that this is accomplished by coupling small fractions of the counter-propagating Brillouin waves out of the loop 14, and combining the waves so that they interfere to provide a Brillouin output wave, which sinusoidally varies in intensity at a beat frequency. The frequency difference (Δf) is equal to the beat frequency of this Brillouin output wave, and thus, by detecting the output wave beat frequency, an indication of rotation rate may be obtained.

Figure 12:
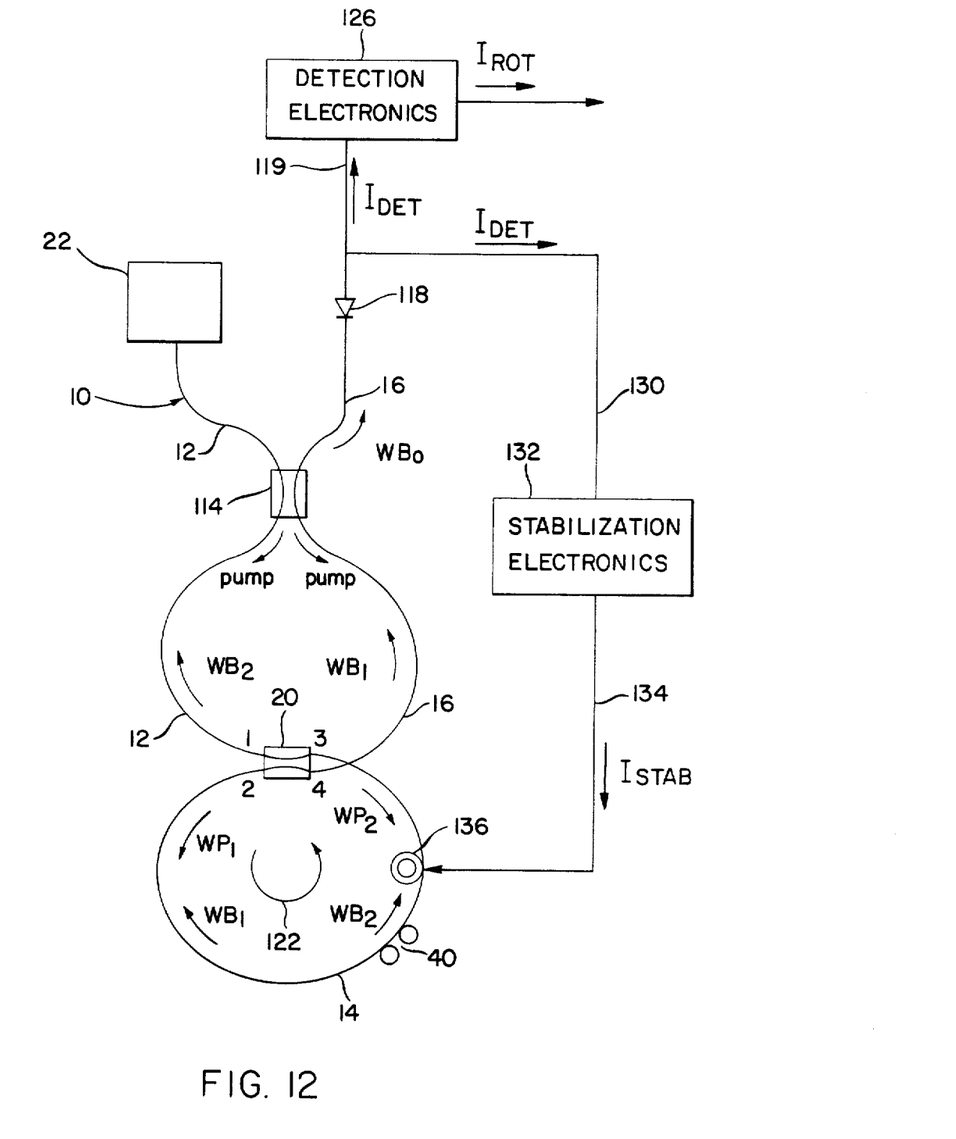
FIG. 12 is a schematic drawing of a rotation sensor utilizing the Brillouin ring laser of the present invention.

Referring now to FIG. 12, the fiber portions 12,16, which project from the ports 1,4, respectively, are passed through a fiber optic evanescent field directional coupler 114. This coupler 114 is identical to the coupler 20, except that its coupling constant is set at 0.5, so that 50% of the light propagating through one of the fibers 12,16 will be coupled to the other of the fibers 12,16. The laser source 22 is optically coupled to introduce light into the fiber portion 12, while a detector 118 is optically coupled to receive light from the end of the fiber portion 16. Thus, the rotation sensor of FIG. 11 utilizes a continuous, uninterrupted strand of optical fiber 10 between the laser source 22 and the detector 118.

The laser source 22 provides pump light which is introduced into the fiber 12. As this pump light travels through the coupler 114, it is divided into two equal portions, so that one-half of the pump power is in the fiber portion 12 when the light reaches the coupler 20, while the other half of the pump power is in the fiber portion 16 when the light reaches the coupler 20. Preferably, the fiber portions 12,16, extending between the couplers 20,114, are identical in length. At the coupler 20, pump light will be introduced into the fiber loop 14, from port 4 to port 2, as well as from port 1 to port 3, to provide two counter-propagating pump light waves $WP_1$ and $WP_2$. Because the loop 14 forms a resonant cavity, the pump light waves $WP_1$ and $WP_2$ will each build up to a maximum circulating power in accordance with Equation 9, above. Assuming the circulating pump power is above the threshold level for Brillouin oscillation, as discussed in reference to Equation 30, a portion of the pump energy of each of the waves $WP_1, WP_2$ will be converted into counter-propagating Brillouin waves $WB_1$ and $WB_2$. Thus, the wave $WB_1$ propagates in a direction opposite that of the wave $WP_1$, and the wave $WB_2$ propagates in a direction opposite to that of the wave $WP_2$.

It will be recalled that, at full resonance, the circulating pump light at ports 2 and 3 interferes with incoming pump light at ports 1 and 4, so that virtually all of the pump light remains in the loop 14, and the pump light output at ports 1 and 4 is zero. In contrast, the stimulated Brillouin waves $WB_1$ and $WB_2$ do not interfere significantly with the incoming pump light (since it is at a substantially different frequency from the pump light), and thus, a small fraction of Brillouin light, equal to $1-K_r$, will exit the coupler 100 as it passes therethrough. For example, a fractional amount of the Brillouin wave $WB_1$ will pass between ports 2 and 4 for propagation through the fiber portion 16, while a fractional amount of the wave $WB_2$ will pass from the port 3 to the port 1 for propagation through the fiber portion 12. These waves $WB_1, WB_2$ are combined by the coupler 114 into a Brillouin output wave $WB_0$ for propagation to the detector 118.

The detector 118 outputs a current $I_{det}$ on the line 119, which is proportional to the intensity of light impressed thereon. Thus, the detector current $I_{det}$ will be proportional to the intensity $I_B$ of the Brillouin output wave $WB_0$. The detected intensity of the Brillouin output wave may be expressed as:

$$I_B = I_{B1} + I_{B2} + 2\sqrt{I_{B1}I_{B2}} \cos2\pi(f_{B1} - f_{B2})t \tag{33}$$

Where: $I_{B1}$ is the intensity of the Brillouin wave $WB_1$; $I_{B2}$ is the intensity of the wave $WB_2$; $f_{B1}$ is the frequency of the wave $WB_1$, $f_{B2}$ is the frequency of the wave $WB_2$, and $f_{B1} - f_{B2}$ is the beat frequency of the output wave $WB_0$.

At zero rotation rate (i.e., Ω equals zero), the frequencies of the two Brillouin waves are the same, so that the interference term (i.e., the cosine term) in Equation 33 is one, and thus, the Brillouin wave intensity $I_B$ is a steady state value. However, upon rotation of the loop 14, e.g., in a counter-clockwise direction, as indicated by the arrow 122, the Brillouin wave $WB_1$ will have a longer optical path around the loop 120 than the Brillouin wave $WB_2$ due to the Sagnac effect. This change in optical path length causes the resonant frequency for stimulated Brillouin oscillation to change for each direction of propagation around the loop. Accordingly, the wave $WB_1$ will resonate at a downshifted frequency, and the wave $WB_2$ will resonate at an upshifted frequency, thereby yielding a frequency difference therebetween. When the waves are combined to form the output Brillouin wave $WB_0$, such frequency difference causes the Brillouin intensity to periodically vary as a function of the cosine of the frequency difference (i.e., the beat frequency), as may be seen from Equation 33. Detection electronics 126, connected to receive signals on the line 119, are provided to detect the frequency of these periodic variations in Brillouin intensity, e.g., by detecting zero crossings, and, in response, output a signal $I_{rot}$, indicative of the rotation rate of the loop. In effect, the electronics 126 provides a band pass filter which passes the beat frequency of the interfering Brillouin waves, while blocking low frequency drift and steady state components of the detector current. Such detection systems are well known in the art, and are capable of detecting frequencies from, e.g, 1 MHz to 100 MHz or more.

It should be noted that, due to the Sagnac effect, the pump light waves, upon rotation of the loop, will undergo a small Sagnac phase shift. However, advantageously, the length of the loop 120 is relatively short (e.g., 10 meters) compared to that of a Sagnac interferometer (e.g., several-thousand meters), and thus, the Sagnac phase shift of the pump light is extremely small, and does not significantly effect the resonance of the pump light, or the detector current.

It should also be noted that any interference between pump light reaching the detector 118 and Brillouin light will not significantly affect detection of the Brillouin wave beat frequency, since the beat between the pump light and Brillouin light, in the embodiment shown, is at about 30 giga Hz, which is too high to be sensed by the detector.

In the embodiment shown, a feedback loop, comprising a line 130, which connects the detector output line 119 to stabilization electronics 132, and a line 134, which connects the stabilization electronics 132 to a PZT cylinder 136 in the loop 14, are provided to stabilize the length of the loop 14 for full resonance at the pump frequency. By way of specific example, the PZT cylinder 136 may be approximately 3 inches in diameter and the fiber 14 may be wrapped thereabout 26 times. The cylinder 136 stretches the fiber 14 in response to voltage on the line 134 to dynamically vary the length of the fiber loop 14.

If, e.g., temperature fluctuations cause the loop length (L) to change from that required for resonance, a portion of the pump power will be coupled from the loop, along with the Brillouin wave, thereby increasing the detector current $I_{det}$. The stabilization electronics 132, in effect, provides a low pass filter which passes low frequency drift components of the detector current $I_{det}$, while blocking higher frequency components caused by interference of the Brillouin waves $WB_1$ and $WB_2$. The electronics 132 outputs a signal on the line 134 proportional to the increase in detector current to drive the PZT cylinder 136 by an amount necessary to restore resonance. This type of stabilization system is fully disclosed in copending U.S. patent application Ser. No. 514,776, entitled "STABILIZED FIBER OPTIC SENSOR", filed Sept. 29, 1982, by the inventors of the present invention. This patent application is hereby incorporated by reference herein.

What is claimed is:

1. A Brillouin ring laser, comprising:
   a length of optical fiber having first and second end portions, and forming a loop portion between said end portion;
   fiber optic coupling means for optically closing said loop portion, the length of said loop portion and the coupling constant of said coupling means selected to form a resonant cavity;
   a source for introducing pump light into said first end portion to provide a pump lightwave which propagates through said loop portion, said pump lightwave circulating through said loop portion and increasing in intensity to a level ($P_c$) greater than the intensity ($P_i$) of the pump light in said first end portion, said intensity $P_i$ above a threshold level which provides an intensity level ($P_c$) sufficient to cause stimulated Brillouin scattering in said fiber loop portion to provide a Brillouin wave which circulates through said fiber loop portion in a direction opposite that of said pump lightwave, and is shifted in frequency relative to said pump lightwave.

2. A Brillouin ring laser, as defined in claim 1, wherein said intensity ($P_c$) of said circulating pump lightwave is greater than:

$$P_c = \frac{2A}{gL}(\gamma_0 + 2\alpha_0 L)$$

where:
A is the effective core area of said fiber;
g is the Brillouin gain coefficient of said fiber;
$\gamma_0$ is the insertion loss of said coupling means;
$\alpha_0$ is the amplitude attenuation coefficient of said fiber; and
L is the length of the fiber loop portion.

3. A Brillouin ring laser, as defined in claim 2, wherein said intensity ($P_i$) of said pump lightwave in said first fiber portion is greater than:

$$P_i = \frac{2A}{gL} \frac{(\gamma_0 + 2\alpha_0 L)^2}{(1-\gamma_0)}$$

4. A Brillouin ring laser, as defined in claim 1, wherein the loop length (L) is chosen such that the fiber transmission losses are equal to the coupler insertion losses.

5. A Brillouin ring laser, as defined by claim 1, wherein the length of said loop portion is substantially equal to in integer number of quarter wavelengths of light propagating therethrough.

6. A Brillouin ring laser, as defined by claim 5, wherein the coupling constant of said coupling means is substantially equal to $K_r$ as defined below:

$$K_r = (1-\gamma_0) \exp(-2\alpha_0 L).$$

7. A method of providing stimulated Brillouin oscillation in an optical fiber, comprising:
   forming a loop in said fiber;
   optically closing said loop with a fiber optic directional coupler; and
   pumping said loop with light at a resonant frequency of said loop with sufficient intensity to cause Brillouin scattering.

8. A method of providing stimulated Brillouin oscillation in an optical fiber, as defined in claim 7, additionally comprising the step of:
   choosing the length of said loop such that fiber transmission losses are equal to coupler insertion losses.

9. A Brillouin ring laser rotation sensor, comprising:
   an optical fiber having first and second end portions with a loop portion therebetween;
   fiber optic coupling means for optically closing said loop portion, the length of said loop portion and the coupling constant of said coupling means selected to form a resonant cavity;
   means for detecting an optical signal;
   means, including a pump light source, for introducing first and second input pump lightwaves for propagation in opposite directions about said loop, said pump lightwaves at the resonant frequency of said loop, and having sufficient intensity to cause stimulated Brillouin scattering in said loop to provide first and second Brillouin waves which counter-propagate relative to said first and second pump lightwaves, respectively, and which resonate in said loop at a frequency less than said pump lightwaves, the frequency at which each of said Brillouin waves resonates changing in response to rotation of said loop portion to provide a frequency difference therebetween, indicative of the rotation rate of said loop portion;
   said fiber optic coupling means including means for coupling a fraction of said first and second Brillouin waves from said loop and for combining said Brillouin waves to form a Brillouin output wave, said Brillouin output wave having a beat frequency equal to the difference in frequency between said Brillouin waves; and
   means for guiding said Brillouin output wave to said optical signal detecting means, said detecting means detecting said beat frequency.

10. A Brillouin ring laser rotation sensor, as defined in claim 9, wherein said fiber optic coupling means comprises a evanescent field, fiber optic directional coupler.

11. A Brillouin ring laser rotation sensor, as defined in claim 9, wherein said pump lightwave introducing means comprises a helium neon laser.

12. A Brillouin ring laser rotation sensor, as defined in claim 9, additionally comprising:

means for stabilizing the length of said loop to maintain resonance of said pump lightwaves circulating in said loop.

13. A Brillouin ring laser rotation sensor, as defined in claim 9, wherein (i) said guiding means comprises said second end portion of said fiber, (ii) said first end portion of said fiber is coupled to said light source, and (iii) said fiber is continuous and uninterrupted between said first and second end portions.

14. A method of sensing rotation, utilizing an optical fiber having first and second end portions with a loop portion therebetween, said method comprising:

optically closing said loop portion utilizing a fiber optic directional coupler;

selecting the length of said loop portion and the coupling constant of said coupler to form a resonant cavity;

introducing first and second input pump lightwaves for propagation in opposite directions about said loop, said pump lightwaves at a resonant frequency of said loop, and having sufficient intensity to cause stimulated Brillouin scattering in said loop to provide first and second Brillouin waves which counter-propagate relative to said first and second pump lightwaves, respectively, and which resonate in said loop;

rotating said loop to provide a frequency difference between said Brillouin waves;

coupling a fraction of said first and second Brillouin waves from said loop;

combining said Brillouin waves to form a Brillouin output wave, said Brillouin output wave having a beat frequency equal to the difference in frequency between said Brillouin waves; and detecting said beat frequency.

15. A Brillouin ring laser, comprising:

a length of optical fiber having first and second end portions and forming a loop portion therebetween;

a source for introducing light into the first end portion of said fiber for propagation through said loop to said second end portion; and means for optically closing said loop to cause light to circulate in said loop, said loop closing means having sufficiently low losses that said circulating light causes stimulated Brillouin oscillation in said loop when said light in said first fiber portion has an intensity of less than 10 mW.

* * * * *